United States Patent [19]
Penna

[11] Patent Number: 5,905,503
[45] Date of Patent: May 18, 1999

[54] RENDERING AN IMAGE USING LOOKUP TABLES GIVING ILLUMINATION VALUES FOR EACH LIGHT SOURCE BY DIRECTION AND DISTANCE

[75] Inventor: David E. Penna, Redhill, United Kingdom

[73] Assignee: U.S. Philips Corporation, New York, N.Y.

[21] Appl. No.: 08/707,087

[22] Filed: Sep. 3, 1996

Related U.S. Application Data

[63] Continuation of application No. 08/185,639, Jan. 24, 1994, abandoned.

[30] Foreign Application Priority Data

Jan. 28, 1993 [GB] United Kingdom .................. 9301661

[51] Int. Cl.$^6$ .................................................. G06T 15/50
[52] U.S. Cl. .......................................... 345/426; 345/427
[58] Field of Search .................................. 395/119, 122, 395/126, 132; 345/426–427

[56] References Cited

U.S. PATENT DOCUMENTS

| | | | |
|---|---|---|---|
| 4,709,231 | 11/1987 | Sakaibara et al. | 395/126 |
| 4,943,938 | 7/1990 | Aoshima et al. | 395/122 |
| 4,953,107 | 8/1990 | Hedley et al. | 395/122 |
| 4,982,342 | 1/1991 | Moribe et al. | 395/425 |

FOREIGN PATENT DOCUMENTS

| | | |
|---|---|---|
| 0438195 | 7/1991 | European Pat. Off. . |
| 2240015 | 7/1991 | United Kingdom . |

OTHER PUBLICATIONS

"Using the Video Lookup Table for Reflectivity Calculations: Specific Techniques and Graphic Results" Computer Graphics and Image Processing vol. 17, No. 3, Nov. 1981 pp. 249–261.

"A Comprehensive Light–Source Description for Computer Graphics" Verbeck et al, IEEE CGEA, Jul. 1984, pp. 66–75.

"Lighting Controls for Synthetic Images" Warn, Computer Graphics, vol. 17, No. 3, (Jul. 1993) pp. 13–21.

Computer Graphics: Principles and Practice, Foley et al, pp. 741–744.

"Shading Models for Point and Linear Sources" Nishita et al, ACM Translations on Graphics, vol. 4, No. 2, Apr. 1985, pp. 124–146.

"Pyramidal Parametrics" L. Williams, Computer Graphics, vol. 17, No. 3, (Jul., 1983), pp. 1–11.

"Texture and Reflection in Computer Generated Images" J.F. Blinn et al, Communications of the ACM, vol. 19, No. 10, Oct. 1976, pp. 542–547.

*Primary Examiner*—Anton W. Fetting
*Attorney, Agent, or Firm*—Jack D. Slobod

[57] ABSTRACT

A 3-D image synthesis apparatus maintains an "object database" (OBJ) defining a 3-D world to be represented on a 2-D display screen (DIS). The object database includes light sources (LS) which have non-uniform distributions of illumination. To simplify calculations of the illumination of an object surface ($P_O$), the apparatus pre-stores (606) one or more look-up tables. The look-up table (606) is then addressed by polar coordinates ($\theta,\phi$) calculated per pixel of the output image, to incorporate the dependency of illumination on direction. Several tables may be stored for each light source, each representing the illumination pattern at a different distance (D) from the light source. Smooth variations can be achieved by interpolation between integer values of $\theta,\phi$ and D.

12 Claims, 4 Drawing Sheets

RENDERING AN IMAGE USING LOOKUP TABLES GIVING ILLUMINATION VALUES FOR EACH LIGHT SOURCE BY DIRECTION AND DISTANCE

This is a continuation of application Ser. No. 08/185,639 filed Jan. 24, 1994 abandoned.

FIELD OF THE INVENTION

The invention relates to a method of rendering a two-dimensional (2-D) image representing a three-dimensional object space defined in an object database. The invention relates in particular to the synthesis of such images in real-time, which typically involves the use of special purpose image synthesis hardware for the execution of the method.

DESCRIPTION OF THE RELATED ART

A wide range of image rendering techniques and apparatuses are described in "Computer Graphics: Principles and Practice" by Foley, van Damm, Feiner and Hughes, published by Addison-Wesley, ISBN 0-201-12110-7.

A problem in real-time image synthesis systems is accurately modelling the pattern of light falling on an object surface from light sources which are not simple point sources radiating light equally in all directions. A technique described by David R. Warn in "Lighting Controls for Synthetic Images", Computer Graphics Vol. 17 No. 3 (July 1983), pages 13–21, uses a mathematical function of the angle between the line from a light source to the point being illuminated and the direction of the light source to determine the light source intensity at the point of interest.

Aside from the provision of simple 'flaps' to restrict the extent of illumination, the Warn lighting model can only describe circularly symmetrical point light sources such as simple spotlights.

Many light sources such as luminaires for interior lighting have arbitrarily complex and above all asymmetrical intensity distributions, which can be measured and represented by two-or more-dimensional goniometric diagrams. In "A Comprehensive Light-Source Description for Computer Graphics", IEEE CG&A, July 1984, pages 66–75, C. P. Verbeck and D. P. Greenberg describes a computer program 'Bulb' which can receive arbitrary goniometric definitions of light distributions and, approximating these with a succession of spline curve functions, obtain the relative illumination in any direction from the light source. Unfortunately, such a technique is unsuitable for implementation in low-cost, real-time image synthesis, where the hardware for such intensive, per-pixel calculations is not normally available.

SUMMARY OF THE INVENTION

It is an object of the invention to enable the modelling of complex light sources in real-time using low-cost image synthesis hardware.

The invention provides a method of rendering a two-dimensional (2-D) image of a three-dimensional (3-D) object space defined by an object database, the object database defining at least one light source having a position and a direction in the object space, the method including the steps of:

(a) creating and storing for the light source a 2-D table of illumination values representing a variation of illumination dependent on a direction relative to the light source direction;

(b) identifying a point of interest in the object space and determining a 2-D direction in object space from the light source position to the point of interest, relative to the light source direction; and (c) using the determined relative direction as an index to the stored 2-D table to obtain a value for illumination by the light source at the point of interest.

The use of a 2-D look-up table allows the implementation of arbitrarily complex lighting functions without complex calculations at the time of rendering. More importantly, 2-D look-up hardware is frequently available already in real-time image synthesis hardware for the purpose of texture mapping. If the hardware is sufficiently configurable, the provision of expensive hardware dedicated to illumination modelling can thus be avoided.

The values stored in the 2-D table may represent the variation in illumination over a spherical surface at least partially surrounding the position of the light source in object space, the 2-D direction used as an index in step (c) comprising a pair of angular coordinates. The angular coordinates may for example correspond to the transverse and longitudinal angles of a conventional asymmetric goniometric diagram of the illumination distribution.

It is desirable that shading in the rendered image is smooth, without obtrusive "contouring" effects. To this end, some form of filtering is desired in reading from the table. In one embodiment, the direction index has at least one fractional component, the illumination value obtained in step (c) being derived from a plurality of the values stored in the 2-D table, by filtering in accordance with the said fractional component(s). Filtering hardware such as a bilinear interpolator is frequently available in the existing texture mapping hardware.

The 2-D table may be one of a series of 2-D tables stored for the light source, each representing the variation of illumination at a different distance from the light source position, while the step (b) further comprises determining the distance in object space from the light source position to the point of interest and the step (c) further comprises using the distance as a distance index to select an appropriate 2-D table from among the series of 2-D tables.

Many real light sources have a geometry such that the distribution of illumination varies according to the distance from the light source to the point of interest, as well as the direction. There is no provision for incorporating such variations in the known methods. Conventional texture mapping hardware frequently provides for multiple 2-D arrays, as described, for example in GB-2240015-A, so that the proposed method can again be implemented by efficient use of existing hardware.

Again, to avoid contouring, the distance index may also have a fractional component, the illumination value obtained in step (c) being interpolated between values stored in a plurality of 2-D tables of the series, in accordance with the said fractional component of the distance index.

As is well known, aside from distance variations caused by the geometry of the light source, the intensity of illumination is inversely proportional to the square of the distance from the light source. Accordingly, where a series of 2-D arrays are stored for different distances, the illumination values stored in each 2-D table of the series may incorporate an intensity variation inversely proportional to the square of the corresponding distance from the light source position. This avoids separate division by the square of the distance. If interpolation. between 2-D tables is used, the inverse-square variation is effectively incorporated in a piecewise linear approximation.

Incorporating the inverse-square variation in the tables themselves can require an undesirably large dynamic range in the stored values, however. Preferably therefore, the illumination values stored in each 2-D table of the series are normalized with reference to a constant distance from the light source position, the step (c) further comprising scaling the values obtained from the 2-D table to incorporate an intensity variation at least approximately inversely proportional to the square of the distance from the light source position. A piecewise linear approximation can again be incorporated by linear interpolation between inverse-squared distance values associated with each 2-D table, in accordance with a fractional component of the distance-index.

The amount of detail in the illumination distribution may vary with distance. The 2-D tables of the series may therefore be different sizes. In particular, for many light sources fine detail will be present in the distribution only at close range. Accordingly, the 2-D tables in the series may decrease in size with increasing distance from the light source position. Simplified index calculations can result if each table is half the size of its predecessor in one or both dimensions.

It may save storage space if in step (a) a range of direction in which the illumination value is constant is not represented in the 2-D table, the step (c) comprising substituting the constant value for the illumination value when the direction determined in step (b) is within the said certain ranges. Many light sources have an entire hemisphere of zero values, illumination, for example.

Similarly, in one embodiment of a method according to the invention, in step (a) at least one degree of symmetry is imposed upon the variations of the illumination values, and only a subset of the possible 2-D directions are represented in the values stored in the 2-D table, the step (c) including, in a case where the direction determined in step (b) is outside the subset of directions represented in the 2-D table, transforming the determined direction in accordance with the imposed symmetry to obtain the index into the 2-D table.

The invention further provides an apparatus for synthesizing images of three-dimensional scenes, the apparatus comprising:

means for maintaining an object database describing the arrangement and appearance of objects in a 3-D space (the object space);

means for defining a viewpoint for representation of the objects to a user of the apparatus; and means for rendering via a display device a two-dimensional representation of the object space as seen from the viewpoint, by means of geometrical transformations of the object database, characterized in that the object database includes definitions of at least one light source and in that the rendering means operates to model the effect of the light source by a method in accordance with the invention as set forth above.

BRIEF DESCRIPTION OF THE DRAWING

Embodiments of the invention will now be described, by way of example, with reference to the accompanying drawings, in which.

DETAILED DESCRIPTION OF THE PREFERRED EMBODIMENTS

Figure 1:
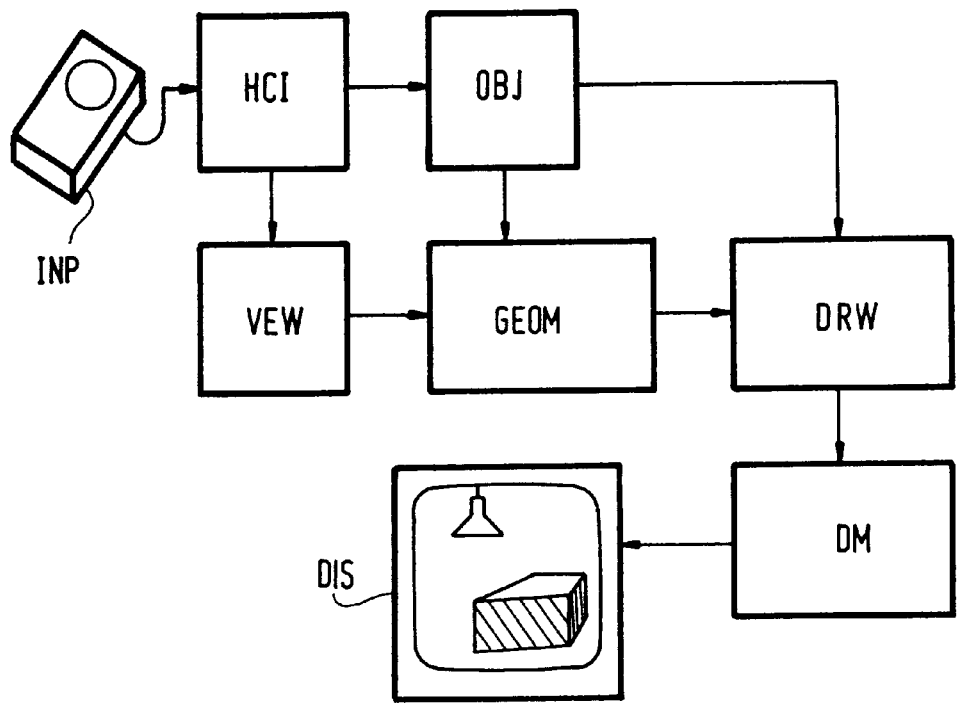
FIG. 1 shows schematically an image synthesis system suitable for operation in accordance with the invention.

FIG. 1 shows schematically an apparatus for the computer generation and display of images on a two-dimensional (2-D) display representing three-dimensional (3-D) objects. A database module OBJ stores and manages a database forming a model of a three-dimensional environment, the "object space", containing various three-dimensional objects, each modelled as a group of object primitives. Each primitive may, for example, be a polygonal surface or a curved patch which in turn is defined by a geometric description, for example vertex coordinates, and a surface description such as color, texture, transparency, surface normal, etc. Geometric and surface descriptions of light sources are also be included. Another module VEW defines a viewing space, for example in terms of the position in object space of a view-point, the direction of view and the field of view.

User input device INP, such as a track ball, mouse and/or keyboard, are connected to a human-computer interface module HCI which allows a user to manipulate or modify objects within the object space or to manipulate the view point, direction of view and other attributes of the viewing space. A geometry module GEOM performs geometric transformations to translate the various object space geometric descriptions of primitives defined in the database module OBJ to equivalent descriptions in the viewing space. These transformations will generally include translation, rotation and perspective as is well known in the art. The surface descriptions of the primitives are also defined in accordance with lighting conditions in the viewing space. In the normal case where the image is only two dimensional, coordinates in the viewing space in 2-dimensions, typically called x and y, will correspond linearly to the screen coordinates, while a third coordinate z corresponds to the depth of the object into the screen.

The geometry module GEOM passes the viewing space primitive descriptors to a rendering module DRW which converts the viewing space primitive descriptions into a form suitable for display, typically by scan conversion into a 2-D array of pixel values in an image buffer memory IMINT. The rendering module DRW loads pixel color values (for example R,G,B components) into a display memory DM, which is then scanned in a systematic manner to drive a raster scan display device DIS, for example a cathode ray tube (CRT) display monitor.

The geometry and rendering modules GEOM and DRW are typically arranged, by means known generally in the art, to implement hidden-surface removal, lighting calculations, antialias filtering and other miscellaneous effects, in order that the displayed image creates an impression of realism in the mind of the user viewing the display device DIS. Many different methods of implementing these effects are known to those skilled in the art and described, for example, in the book by Foley et al, mentioned above.

Figure 2:
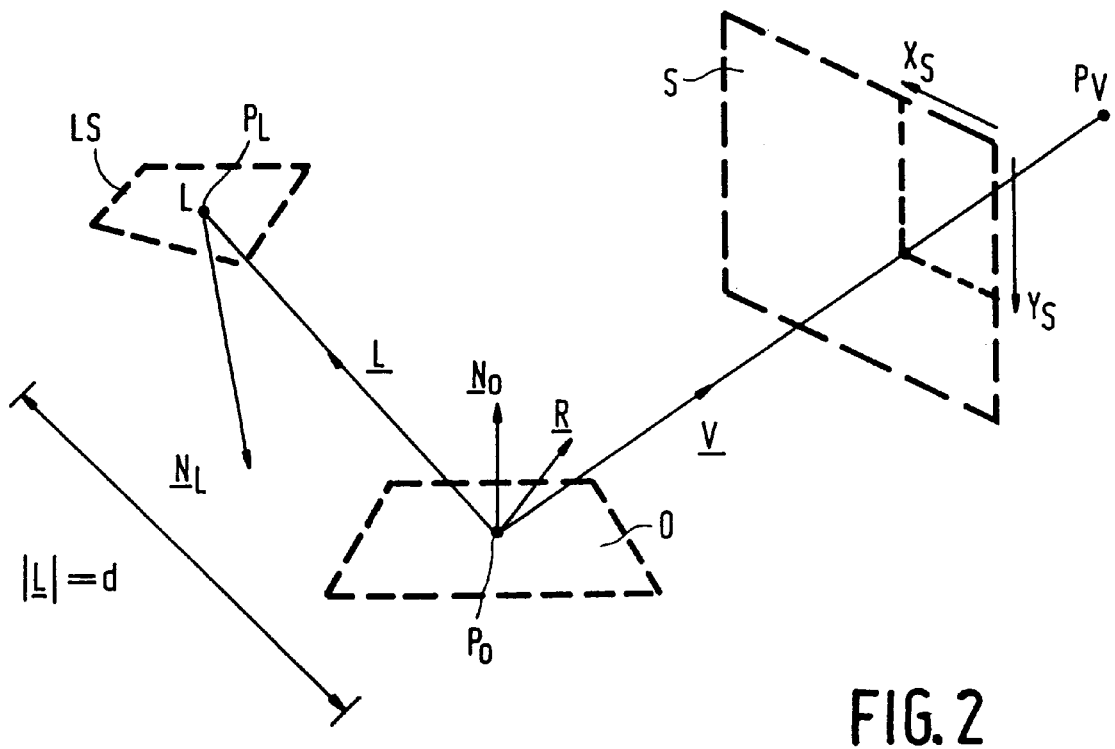
FIGS. 2 and 3 illustrate a lighting model used in the system of FIG. 1.

FIG. 2 illustrates one model of the lighting problem faced by the drawing module DRW. A point $P_O$ on an object surface 0 in the 3-D object space is seen by the viewer from a point $P_V$. A vector $\underline{V}$ extends from $P_o$ through a pixel at location $x_S, y_S$ on the display screen S to the viewpoint $P_V$. The object surface at $P_O$ has a normal (perpendicular) vector $N_O$. A light source LS has a position $P_L$ in object space, and as a direction vector $N_L$. A vector $L$ extends from the object at point $P_O$ to the light source position $P_L$, at a distance d.

In order to determine the color of the pixel required to represent the point $P_O$ to the viewer, one problem to be solved is: what is the intensity (and color) of the light reaching the viewpoint $P_V$ from the point $P_O$ on the object surface? The answer to this question depends in a manner known from the cited prior art on (i) the intensity and color of the light arriving at $P_O$ from the light source and (ii) on the reflection properties of the object surface at $P_O$.

As is well known, the reflection characteristics (ii) can be modelled as a combination of diffuse and specular reflections. The diffuse component depends on the (cosine of the) angle between vector $L$ and the surface normal vector $N_O$. The specular component depends on both vectors $L$ and $V$, having a maximum intensity when viewpoint vector $V$ coincides with a reflection vector $R$, which is the reflection of light source vector $L$ about the surface normal vector $N_O$. The present invention is not concerned with the modelling of reflection characteristics, but rather with part (i) of the problem posed above: what is the intensity of illumination arriving at the point of interest ($P_O$) from the light source, given the direction and distance from $P_L$ to $P_O$. It should be appreciated that color variations many also be of interest, but following discussion will in general be limited to discussion of illumination intensity only. It is a relatively trivial matter for the person skilled in the art to extend the teaching to include color variations.

One factor to be included in the intensity variation of most light sources is the well-known proportionality to the inverse-square of the distanced from the light source to the point of interest, that is to say, a factor $d^{-2}$. For light sources other than uniformly radiating point sources, however, there is a further dependence on the direction from the light source, to the point of interest, which direction can be pressed as the difference between vector $L$ in FIG. 2 and the reference direction or "normal" vector of the light source, $N_L$.

Figure 3:
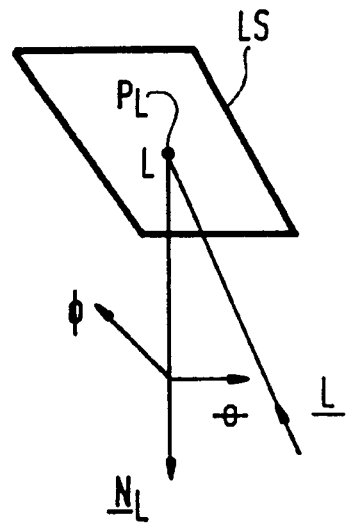

In the embodiment described herein, FIG. 3 illustrates the polar coordinate system used to represent the relative direction from the light source position $P_L$ to the point of interest $P_O$. Relative to the light source normal vector $N_L$, two rthogonal angular coordinates θ and φ are defined which can each take any value from −180° to +180°.

Figure 4:
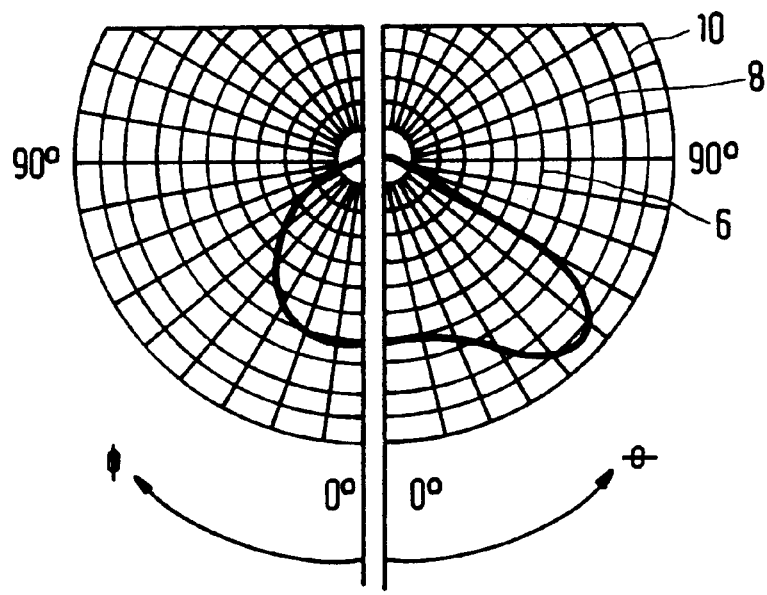
FIG. 4 is a goniometric diagram showing the intensity distribution of an example light source.

FIG. 4 shows in the form of a two-axis goniometric plot in the intensity distribution of a commercially available luminaire housing a pair of straight fluorescent tube lamps. For a constant distance d (hence constant $d^{-2}$), the right hand polar curve shows measured values of intensity transverse to the luminaire major axis (φ=0°; θ varies from 0° to 180°). The left hand polar curve shows the variation parallel to the major axis of the luminaire (θ=0°, φ varies from 0° to 180°). These plots can be supplemented by measurement and/or interpolation to obtain the relative intensity for any direction (θ,φ). Since the luminaire represented in FIG. 4 is for downlighting purposes, the relative intensity is zero above 90° from the normal (downward) direction $N_L$. A shaped 'bulge' can be seen in the intensity curve around θ=45°, which combines with the $d^{-2}$ variation to provide more uniform illumination over a horizontal working area below than would be provided by a simple point or linear light source.

As mentioned in the introduction above, known lighting models for practical image synthesis have been limited to simple, circularly symmetrical functions of the direction (0,φ). Even so, the calculations required, per pixel, to incorporate such a function cannot be performed with sufficient speed in known low-cost rendering systems. It will now be described how the modelling problem can be reduced to a look-up operation, in particular to take advantage of hardware that is provided for texture mapping in known systems.

Figure 5:
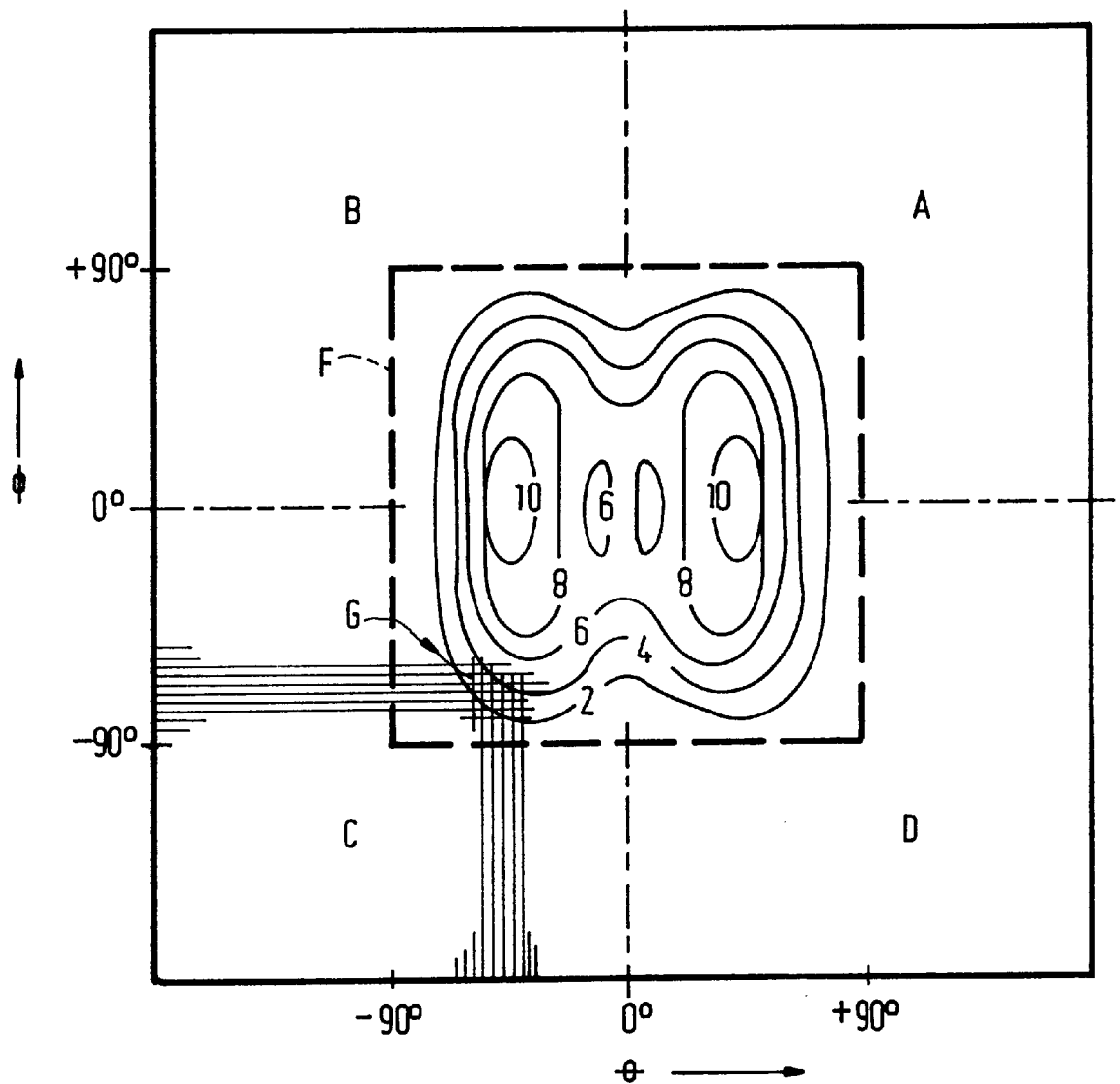
FIG. 5 illustrates the storage of a 2-D table representing the distribution of FIG. 4.

FIG. 5 shows how the intensity distribution of FIG. 4 can be stored in a 2-D look-up table, to allow rapid access in an image synthesis system to the illumination intensity due to a light source at any point of interest. The spherical surface defined by coordinates θ and φ is transformed to a square (or in general, rectangular) array of sample storage locations, illustrated at G. At each location a relative intensity value is stored and can be identified by a 2-D direction index corresponding to θ (horizontal axis) and φ (vertical axis in FIG. 5).

The number of samples stored in each direction depends on the amount of detail required in the illumination pattern. The table might be as large as 512×512 samples, for example, containing a lot of detail at a resolution better than 1° in θ and φ. The resolution (number of bits stored) at each location may also be chosen to be as small or large as required for a realistic representation. Contours are shown in FIG. 5 containing areas of zero, 2, 4, 6, 8 and 10 for the purpose of comparison with the plots of FIG. 4. In practice, something between four and eight bits might be provided to represent the pattern in a smooth and accurate manner.

Once the table of FIG. 5 has been stored, the drawing module DRW (FIG. 1) can render an image of a scene illuminated by the light source by determining θ and φ and using them as a 2-D index to read the corresponding illumination value from the 2-D table, and hence represent the pattern of illumination enclosed therein upon an object space comprising reflecting surfaces at different distances and orientations. There is no need to evaluate a complicated function of illumination distribution function at each point of interest, yet arbitrarily complex distributions can be represented.

It is very important to avoid contouring effects and "blockiness" in the illumination of object surfaces that would result from a coarsely sampled variation stored in the 2-D table. Most light sources have smoothly varying and continuous distributions, and the eye is extremely sensitive to contours in the shading of an image. Accordingly, values obtained from the table should be filtered in some manner to achieve a smooth variation of intensity with θ and φ. A simple method of doing this is to determine θ and φ to a greater accuracy than required for indexing samples in the 2-D table, and to use the remaining fractional components of the index (θ,φ) to interpolate between four values stored at the nearest integer locations in the 2-D table. The implementation of similar actions is already known in the field of texture mapping, as will be seen later in the exemplary embodiment of FIG. 6.

Remaining with the 2-D table of FIG. 5, however, much scope for economy can be seen. Firstly, if interpolation or other filtering of stored intensity values is implemented, the resolution required in the 2-D table for a light source having relatively little detail in its intensity distribution, such as that of FIGS. 4 and 5, can be reduced, for example to 32×32 samples. Similarly the number of bits per sample might be reduced, perhaps as low as 4 bits (16 levels of relative intensity).

Further economy can be seen by exploiting large ranges of angles θ and/or φ where the relative intensity is constant.

For example, in the table of FIG. 5, it can be seen that the intensity values are all zero in areas where θ or φ is over 90° from the normal direction $N_L$ (the upper hemisphere). Because of the projection chosen, this hemisphere occupies three-quarters of the total storage space for the table. It would be more economical, therefore, to store only the central quarter (dotted box F) of the distribution. It is then a simple matter to substitute zero for a value obtained from the table when θ or φ exceeds ±90°, or to limit θ and φ at ±90°. By this measure, the storage capacity required for the table can be quartered.

For the distribution shown in FIGS. 4 and 5, the storage capacity required for the 2-D table (at a given resolution) can be further quartered by noting that the distribution has two axes of symmetry, namely the chain dotted lines θ=φ° and φ=0°. With suitable indexing logic, it is then only necessary to store values in a single quadrant A, B, C or D. Directions (θ,φ) occurring outside that stored quadrant can be translated by reflection operations to obtain indexes to the corresponding stored sample. For example, if only quadrant A is stored, a direction (θ,φ)=(−56,+32) in quadrant B can be mapped to direction (+56,+32) in quadrant A to obtain a valid index to the relevant stored sample. Similarly any direction (θ,φ) in quadrant B, C or D can be mapped to a corresponding direction in quadrant A simply by replacing a negative θ or φ with the corresponding positive value. Similar schemes will be apparent for taking advantage of other types of symmetry.

The range of light sources that can be represented in the 2-D table or a series of 2-D tables is very great indeed, and each offers the potential for very optimally economic storage of the 2-D table(s). For example one source might illuminate throughout the entire sphere, while having no fine detail in its distribution. Another light source might project a beam over a narrow range of angles. The beam might be narrow while including much fine detail. A table of, say, 512×512 full-color samples over a range of θ and φ of ±10° could represent a slide projector, for example.

Figure 6:
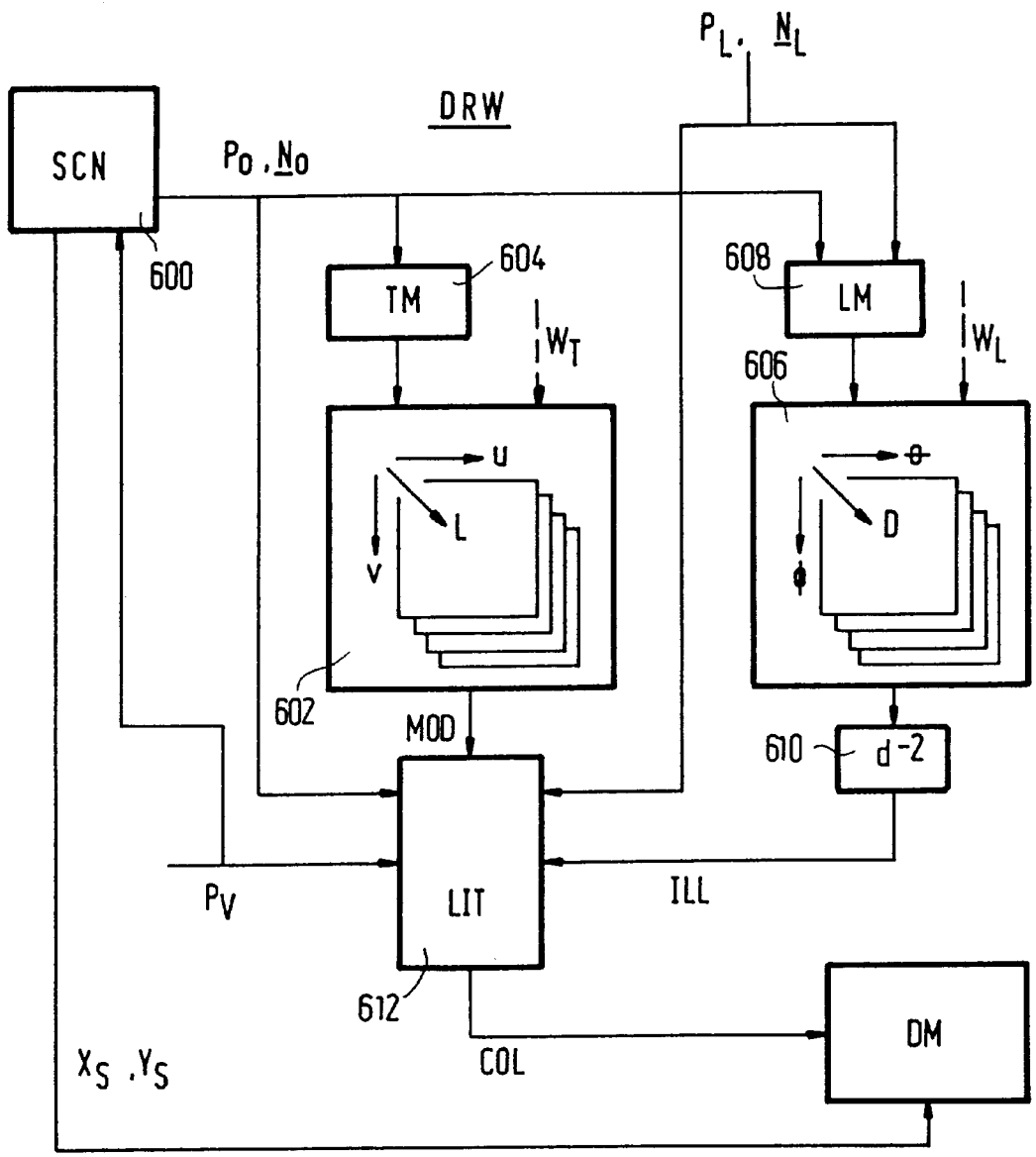
FIG. 6 shows a part of the system of FIG. 1 arranged to operate in accordance with the present invention.

FIG. 6 illustrates how the rendering module DRW of the system of FIG. 1 is organized to exploit 2-D tables as representations of shaped light sources to give a high degree of realism in real time image synthesis. The module DRW shown in FIG. 6 also implements texture mapping to add surface detail to objects in the 3-D object space, and illustrates the similarity between texture mapping hardware and the hardware required to implement the present invention.

The module DRW includes: a scan converter unit 600, a texture memory array 602; a texture memory address calculator 604; a light source look-up memory 606; polar coordinate calculator 608; an inverse-square scaler 610; a pixel color calculator 612. The module DRW receives from the geometry module GEOM (FIG. 1) the various parameters $P_V$, $P_O$, $N_O$, $P_L$ and $N_L$ for each 3-D object primitive to be represented on screen, and the relevant light sources.

Scan converter 600 is responsible for at least the final stages of the transformation from object space to screen space (pixels), which depends on the viewpoint $P_V$. In operation, scan converter 600 generates a series of pixel addresses $x_s, y_s$ defining an area of the desired image, while simultaneously calculating the corresponding point $P_O$ in object space where the viewer's line of sight meets the surface of an object. For each pixel address $(x_s, y_s)$ a color value (for example 24 bits calculator 612, to represent the color of the object surface at point $P_O$ as seen from the viewpoint. This color value is then stored in the display memory DM at a location where it defines the color of the corresponding pixel.

The generation of color values is carried out by the color calculator 612 using a surface description for the object primitive and light source descriptions, all derived from the object database. The complexity of these descriptions is largely a matter of design choice, but in the present embodiment, the surface description includes a texture map reference and reflectivity values (specular and diffuse). The texture map reference refers to a pattern of surface color values which has previously been stored ($W_T$) as a two-dimensional array in the texture memory 602.

Texture mapping is described in detail in the book by Foley et al at pages 741–744, and in the references cited therein. Such detail is not necessary for an understanding of the present invention. It is relevant to note, however, that to avoid aliasing artifacts the color values stored in the texture memory are usually filtered, for example because the area of the pixel when projected onto the object surface O can cover a significant number of texture samples. Many techniques are known for performing such filtering. A simple technique involves the storage of multiple pre-filtered versions of the same texture map, in a "MIP map" or similar pyramidal array. Fractional parts of texture coordinates are used, together with a distance index L, to generate color values which are interpolated between adjacent color values in the texture map, and between values in adjacent pre-filtered versions of the texture map. One apparatus embodying such a-technique is described in EP 0 438 195 A.

The present embodiment employs a similar technique, such that each texture map is represented in several pre-filtered arrays, and the texture memory address calculator 604 derives for each pixel address a texture coordinate pair (u,v) and a distance index L. These values are used to generate texture memory addresses to look up several texture sample values, which are then combined in accordance with the fractional parts of u, v and L to obtain the interpolated color value MOD for the surface of the object at the corresponding point $P_O$. This value MOD is supplied to the color calculator 612.

The light source look-up memory 606 and polar coordinate calculator 608 are similar in structure and operation to the texture memory 602 and texture address calculator 604 respectively. It is an advantage of the embodiment described that in fact the same memory and addressing hardware can be constructed so that it is readily configurable for either purpose. Indeed, means may advantageously be provided for dynamically reconfiguring the hardware to optimize performance as the number and complexity of texture maps and light source models vary according to the scene being displayed.

Whereas the texture memory 602 has stored within it surface color patterns for one or more objects, the light source look-up memory has stored within it a look-up table of illumination intensity values such as those described above with reference to FIG. 5. Polar coordinate calculator 608 receives the position $P_O$ and surface normal direction $N_O$ of the point of interest, and also receives the position $P_L$ and direction $N_L$ of the light source. From these, the calculator 608 is able to generate polar coordinates θ and φ which form addresses for the look-up memory 606.

From these addresses, the look-up memory reproduces a relative illumination intensity value for the point $P_O$ on the object surface, in accordance with the direction of the point relative to the light source. Calculator 608 also calculates the distance d from the light source to the surface, which is used by scaler 610 to modify the illumination intensity in accordance with the inverse-square law. This yields an actual illumination intensity value ILL for the object point $P_O$, for use by the pixel color calculator 612. For the point $P_O$, calculator 612 uses the illumination intensity ILL to modify the surface color value MOD, taking into account the specular and diffuse components of the surface reflectivity as appropriate. This may be done in combination for several light sources before a final color value COL is stored in the display memory for the pixel at $X_S$, $Y_S$ on the display screen.

To avoid "contouring" in the shading of the resulting image, corresponding to the contours shown in the example of FIG. 5, interpolation between the individual values stored in the look-up table 606 is implemented in accordance with fractional components of the polar coordinates. This feature can clearly be implemented using hardware in common with the texture mapping hardware, but also allows great economy in the look-up tables. Because most light source patterns comprise gently-varying functions, the smoothing effect of the interpolation allows use of a look-up table with relatively few entries, relatively coarsely quantised (few bits per entry).

As noted previously, the illumination distribution of complex light sources can vary with distance. Accordingly, look-up memory 606 comprises several illumination look-up tables, each corresponding to a different distance from the light source. The distance d calculated between the points $P_L$ and $P_O$ is used to obtain a distance index D for use together with the polar coordinates θ and φ to address the look-up memory 606. As with texture mapping, the distance index D has a fractional component to allow smooth interpolation between entries in the look-up memory.

Figure 7:
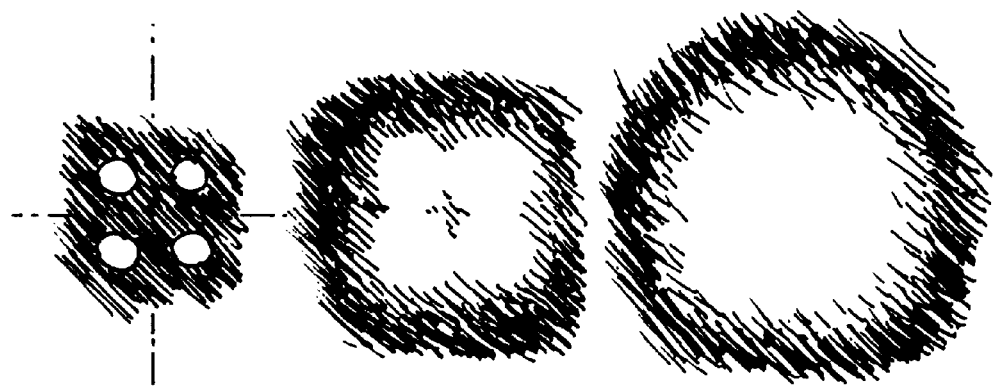
FIG. 7 illustrates the variation with distance of the illustration distribution around a complex light source.

FIG. 7 illustrates the illumination distribution for a complex light source at three different distances, A, B and C. Distribution A (zero distance) shows that the light source actually comprises four circular spotlights. Distribution B corresponds to a short distance from the light source, where the beams of the individual spotlights spread, and begin to merge. Finally for a large distance, distribution C shows how the four beams merge effectively into a single, roughly circular beam. With just these three distributions stored in arrays in look-up memory 606, the interpolation mechanism can provide a reasonably realistic simulation of the complex light source.

For the light source of FIG. 7, of course the known techniques of Warn et al can be used by treating each simple spotlight as a separate source, with the penalty of increased processing effort. For light sources that cannot be reduced to a few simple components (a common example is a car headlamp), the invention provides a uniquely lost-cost solution.

It should be noted that for almost all light sources the amount of detail in the illumination distribution decreases as the distance from the light source increases. This characteristic allows the successive 2-D look-up tables to have fewer and fewer entries as distance increases resulting in very economical storage of these tables. This characteristic can further be exploited however to maximize compatibility between the light source look-up hardware and texture mapping hardware, because in the MIP map, and other known schemes involving the storage of a series of pre-filtered arrays for texture mapping, each array has less detail and fewer samples than the previous one.

Those skilled in the art will appreciate that there are many possible architectures for the scan converter 600 and other parts of the apparatus described, the details of which are not material to an understanding of the present invention. For example, the problem of hidden-surface removal ("HSR") may be addressed by any of a number of well-known methods such as depth-buffering or priority sorting of object primitives before rendering. In the case of depth-buffering, it may turn out that the color values written are overwritten one or more times due to the rendering of object primitives which are closer and closer to the viewpoint.

Other variations are possible, for example in the manner of calculating the inverse-square relationship of illumination intensity and distance from the light source. Instead of providing a separate scaler 610 for this purpose, the values stored in the successive look-up tables for different distance indices D can be pre-scaled to incorporate an inverse-square variation. If linear interpolation is performed between adjacent tables using a fractional part of the index D, the result is a piecewise linear approximation to the true inverse-square variation. A disadvantage of incorporating the inverse-square variation in the look-up tables themselves is that a very wide range of values may need to be stored, requiring more bits per value.

I claim:

1. A method of rendering a two-dimensional (2-D) image of a three-dimensional (3-D) space (object space) defined by an object database, the object database defining at least one light source having a position and a direction in the object space and an asymmetrical distribution of illumination about said direction, the method comprising, performing with a computer the steps of:

(a) creating and storing a two-dimensional (2-D) table of illumination values for the light source at points over a spherical surface at least partially surrounding the light source in dependence on a direction relative to the light source direction specified by two angular coordinates about which light source direction said illumination values are asymmetrically distributed;

(b) identifying a point of interest in the object space and determining two angular coordinates specifying a 2-D relative direction in object space from the light source position to the point of interest, relative to the light source direction; and (c) using the determined two angular coordinates specifying the 2-D relative direction as an index to the stored 2-D table to obtain a value for illumination by the light source at the point of interest.

2. A method as claimed in claim 1 wherein the direction index has at least one fractional component, the illumination value obtained in step (c) being derived from a plurality of the values stored in the 2-D table, by filtering in accordance with the said fractional component(s).

3. A method as claimed in claim 1 wherein the 2-D table is one of a series of 2-D tables stored for the light source, each representing the variation of illumination at a different distance from the light source position, and wherein the step (b) further comprises determining the distance in object space from the light source position to the point of interest and the step (c) further comprises using the determined distance as a distance index to select an appropriate 2-D table from among the series of 2-D tables.

4. A method as claimed in claim 3 wherein the distance index also has a fractional component, the illumination value obtained in step (c) being interpolated between values stored in a plurality of 2-D tables of the series, in accordance with the said fractional component of the distance index.

5. A method as claimed in claim 4 wherein the illumination values stored in each 2-D table of the series are normalized with reference to a constant distance from the light source position, the step (c) further comprising scaling the values obtained from the 2-D table to incorporate an intensity variation at least approximately inversely proportional to the square of the distance from the light source position.

6. A method as claimed in claim 4, wherein the 2-D tables of the series decrease in size with increasing distance from the light source position, each successive 2-D table being half the size of its predecessor in one or both dimensions.

7. A method as claimed in claim 3 wherein the illumination values stored in each 2-D table of the series are normalized with reference to a constant distance from the light source position, the step (c) further comprising scaling the values obtained from the 2-D table to incorporate an intensity variation at least approximately inversely proportional to the square of the distance from the light source position.

8. A method as claimed in claim 7, wherein the 2-D tables of the series decrease in size with increasing distance from the light source position, each successive 2-D table being half the size of its predecessor in one or both dimensions.

9. A method as claimed in claim 3, wherein the 2-D tables of the series decrease in size with increasing distance from the light source position, each successive 2-D table being half the size of its predecessor in one or both dimensions.

10. A method as claimed in claim 1 wherein in step (a), a range of direction in which the illumination value is a constant value is not represented in the 2-D table, the step (c) comprising substituting the constant value for the illumination value when the direction determined in step (b) is within the said certain ranges.

11. A method as claimed in claim 1 wherein in step (a) at least one degree of symmetry is imposed upon the variations of the illumination values, and only a subset of the possible 2-D directions are represented in the values stored in the 2-D table, the step (c) including, in a case where the direction determined in step (b) is outside the subset of directions represented in the 2-D table, transforming the determined direction in accordance with the imposed symmetry to obtain the index into the 2-D table.

12. An apparatus for synthesizing imags of three-dimensional (3-D) scenes, the apparatus comprising:

means for maintaining an object database describing the arrangement and appearance of objects in a 3-D space (the object space);

means for defining a viewpoint for representation of the objects to a user of the apparatus; and means for rendering via a display device a two-dimensional (2-D) representation of the object space as seen from the viewpoint, by means of geometrical transformations of the object database, characterized in that the object database includes definitions of at least one light source and in that the rendering means operates to model the effect of the light source having a position and direction in object space and an asymmetrical distribution of illumination about said direction and comprises means for:

(a) creating and storing for the light source a 2-D table of illumination values of illumination in dependence on a direction relative to the light source direction specified by two angular coordinates;

(b) identifying a point of interest in the object and determining two angular coordinates specifying a 2-D relative direction in object space from the light source position to the point of interest, relative to the light source direction; and (c) using the determined two angular coordinates specifying the 2-D relative direction as an index to the stored 2-D table to obtain a value for illumination by the light source at the point of interest.

* * * * *